(12) United States Patent
Blomberg et al.

(10) Patent No.: US 7,153,071 B2
(45) Date of Patent: Dec. 26, 2006

(54) DEVICE FOR CHIP FORMING MACHINING

(75) Inventors: Patrik Blomberg, Östhammar (SE); Ake Danielsson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 358 days.

(21) Appl. No.: 10/462,615

(22) Filed: Jun. 17, 2003

(65) Prior Publication Data

US 2004/0033113 A1 Feb. 19, 2004

(30) Foreign Application Priority Data

Jun. 17, 2002 (SE) .................................. 0201830

(51) Int. Cl.
*B23B 51/00* (2006.01)

(52) U.S. Cl. ........................ 408/226; 279/8; 408/233

(58) Field of Classification Search .................... 279/8; 408/226, 227, 233, 231, 238; 409/234
See application file for complete search history.

(56) References Cited

U.S. PATENT DOCUMENTS

| | | | |
|---|---|---|---|
| 2,383,688 A * | 8/1945 | Seiter | 279/8 |
| 2,397,382 A | 3/1946 | Smith | |
| 3,320,833 A * | 5/1967 | Andreasson | 408/57 |
| 4,557,642 A * | 12/1985 | Dudas et al. | 408/239 R |
| 4,621,960 A * | 11/1986 | Tollner | 409/232 |
| 4,705,435 A * | 11/1987 | Christoffel | 408/59 |
| 4,748,879 A * | 6/1988 | von Haas | 82/36 B |
| 5,026,224 A * | 6/1991 | Andersson et al. | 409/234 |
| 5,163,790 A * | 11/1992 | Vig | 408/57 |

FOREIGN PATENT DOCUMENTS

| | | |
|---|---|---|
| DE | 199 60 927 A | 1/2001 |
| WO | 91/14073 | 9/1991 |

OTHER PUBLICATIONS

European Search Report dated Jul. 28, 2003.

\* cited by examiner

*Primary Examiner*—Monica Carter
*Assistant Examiner*—J Williams
(74) *Attorney, Agent, or Firm*—Drinker Biddle & Reath LLP

(57) ABSTRACT

A device for chip forming machining including first and second rotatable bodies arranged along a common axis of rotation. The first body forms a male element, and the second body forms a female element into which the male element is threaded for forming a threaded joint. The male element has an outer circumferential area displaced in the axial direction in relation to the thread thereof and which engages a corresponding inner circumferential area of the female element by a press-fit. One or both of those circumferential areas has an out-of-roundness, such that there occurs a press-fit along two or more preselected regions in the circumferential direction.

16 Claims, 2 Drawing Sheets

DEVICE FOR CHIP FORMING MACHINING

This application claims priority under 35 U.S.C. §§119 and/or 365 to Patent Application Serial No. 0201830-7 filed in Sweden on Jun. 17, 2002.

BACKGROUND OF THE INVENTION

The present invention relates to a device for chip forming machining comprising a first and a second rotatable body, the first and second rotatable bodies being arranged along a common axis of rotation, the first body comprising a male element and the second body comprising a female element, into which the male element is inserted for the forming of a joint, the male and female elements each being provided with a thread for the forming of a threaded joint between the first and second body, and the male element comprising at least one outer circumference area, which is displaced in the axial direction in relation to the thread thereof, and which engages a corresponding inner circumference area of the female element by means of a press-fit.

The invention is particularly suitable for devices for drilling, in particular drilling with unbalanced drills in which radially directed force resultants arise as a consequence of the specific positioning of individual cutting inserts. The invention is particularly suitable for the drilling of long holes, i.e., holes having a length that is greater than five times the hole diameter, where it is important that radial force resultants do not result in an angular displacement of a drilling tool provided with cutting inserts in relation to a drill tube connected to the same.

Therefore, the invention will be disclosed for exemplifying purposes, with reference being made to such an application. The invention is applicable, in particular, to drills arranged for drilling according to the ejector principle as well as the STS (Single Tube System) principle, where the chip conveyance is carried out through the tool and a drill tube connected to the same.

BACKGROUND OF THE INVENTION AND PRIOR ART

Drills for deep hole drilling usually comprise a drilling tool provided with cutting inserts, and a drill tube connected to the same, which connects the drill tool to a drilling machine and also has the purpose of leading away machined material from the drill tool.

Usually, the drill tool and the drill tube are connected to each other by means of a threaded joint, a thread-provided end of the drill tube being screwed on a likewise thread-provided part of the drill tool. The primary purpose of the formed threaded joint is to carry axial forces, but also radial forces, between the drill tool and the drill tube.

Furthermore, one or more areas at the side of said threads form a press fit joint between the drill tool and the drill tube. Such areas are formed by an outer circumference of one of said bodies, not provided with threads, having a circular cross-section, and a corresponding inner circumference of the second body, not provided with threads. The body with the part forming the male element being oversized in relation to the body that forms the female element, for the forming of the press fit joint when The parts are screwed together. The primary purpose of the press fit joint is to carry radial forces between the drilling tool and the drill tube, i.e., to prevent the tool from being tilted in relation to the drill tube during use.

As a result of repeated screwing together of the drill tool and the drill tube, there is a risk that the drill tube or the drill tool will be destroyed by virtue of the press fit forces that arise between the same in said press fit area or areas.

Furthermore, the force that is required in order to screw together the drill tool and the drill tube will in certain cases be considerable, depending on the thickness of the material, the specific material and the oversize of the oversized part, alternatively the undersize of an undersized part.

OBJECTS OF THE INVENTION

A primary object of the present invention is to provide a device of the type mentioned in the introduction, the rotatable bodies of which, mutually form a joint of the device, having such a shape that plastic, permanent deformation or the emergence of cracks is decreased or entirely prevented in one or both of the same in the area where press fit occurs with the purpose of controlling or locking the bodies in the radial direction in relation to each other. The joint is however to provide good stability against angular displacement of the first body in relation to the second body by virtue of radial forces resulting during operation.

A secondary object is to provide a device of the type mentioned in the introduction, the rotatable bodies that mutually form a joint having such a shape that less force is required to achieve press fit between the same for inter-radial locking or control.

SUMMARY OF THE INVENTION

The object of the invention is achieved by a device of the type mentioned in the introduction, characterized in that the outer circumference of the male element and/or the inner circumference of the female element in said outer circumference and inner circumference areas has an out-of-roundness, such that there is press fit only along two or more areas, determined beforehand, which are separated from each other seen in the circumferential direction of the male and female elements. The out-of-roundness may consist of the male element having an outer circumference with a radius that is alternately larger and smaller in the circumferential direction than the radius of the inner circumference of the female element. Alternatively, it is the inner radius of the female element that varies along the circumferential direction and that alternately is larger and smaller than the outer radius of the male element. In this disclosure, circumferential direction means a direction transverse to the axis of rotation direction, along the body periphery.

It is preferable that only one of the first and second bodies has said out-of-roundness. When the male element is screwed into the female element, the contact between the two elements in the areas where press fit is found will be only partial and thereby located to the areas where the outer circumference radius of the male element is larger than the inner circumference radius of the female element. In the areas that in the circumferential direction are located between and separate these contact areas, the outer circumference radius of the male element is smaller than, or at the very most, equal to the inner circumference radius of the female element. Materials that are deformed in some or both of the elements in the contact areas will thereby be able to expand or "float" into these intermediate areas. Thereby, undesired plastic deformation, or at least the emergence of strains in the material that are so large that cracks are initiated or grow, is avoided.

Furthermore, as a consequence of the reduced press fit forces, less force will be required for the interconnection of the first and second body.

Furthermore, the invention relates to a rotatable body characterized in that the outer circumference area of the male element, as seen in the circumferential direction, is divided into two or more areas for which the radius from the center axis of the body is larger than for the areas located therebetween.

The invention also relates to a rotatable body characterized in that the inner circumference area of the female element is divided into two or more areas for which the radius from the center axis of the body is smaller than for the other areas, located there between.

BRIEF DESCRIPTION OF THE DRAWINGS

The objects and advantages of the invention will become apparent from the following detailed description of preferred embodiments thereof in connection with the accompanying drawings and in which like numerals designate like elements.

DESCRIPTION OF PREFERRED EMBODIMENTS OF INVENTION

Figure 1:
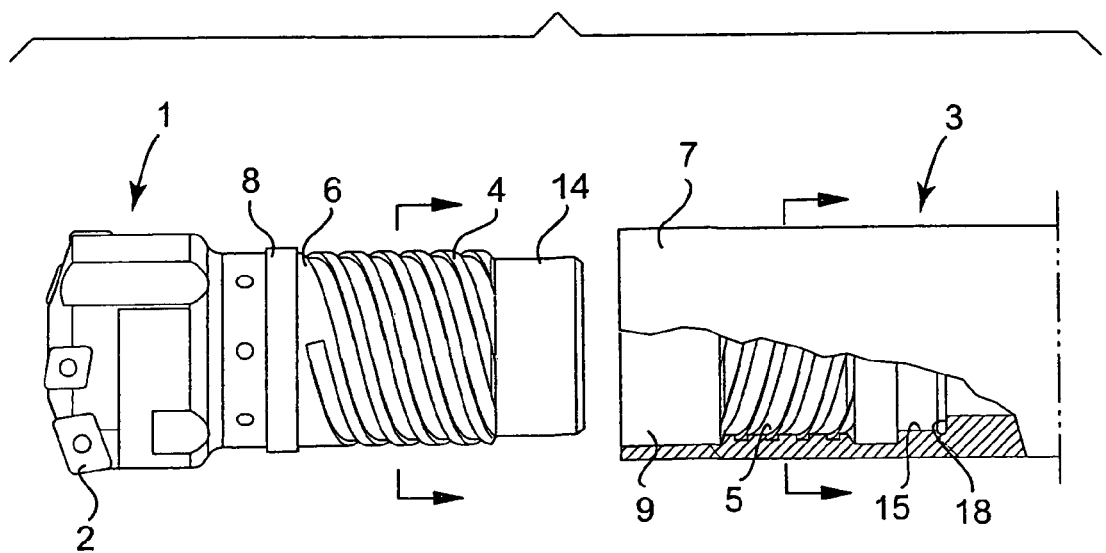
FIG. 1 is a partial section view of a first rotatable body and a spaced-apart second rotatable body according to an example of an embodiment of the invention.
Figure 2:
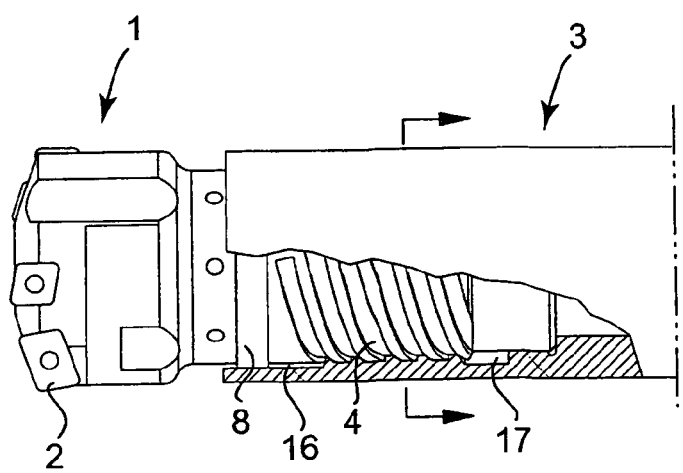
FIG. 2 is a view corresponding to the one in FIG. 1, but with the first body inserted into the second body.

In FIGS. 1 and 2, a first body 1 is shown that forms a tool for rotary machining of a workpiece, which could be of any preferred material but which typically comprises a workpiece of metal (not shown). The tool 1 is provided with cutting inserts 2 at one end thereof for said machining. The tool 1 and the cutting inserts 2 are arranged for drilling. In particular, the tool 1 and the cutting inserts 2 are adapted for the drilling of metal, the cutting inserts 2 being arranged asymmetrically in relation to the axis of rotation of the tool, so that significant radial forces arise in the tool 1 in connection with drilling.

In FIGS. 1 and 2, a second body 3 is also shown, which comprises a tube that is intended to be connected to the first body 1 in one end thereof, and to a rotary machine, in this case a drilling machine, in the other end thereof.

The first body 1 is in this case of tubular shape along a part of the length thereof and comprises a thread 4, in this case a male thread, at a part of the outer circumference thereof. The second body 3 comprises a corresponding thread 5, in this case a female thread, along a portion of the inner circumference thereof The first body 1 defines a male element 6 and the second body 3 defines a female element 7. The male element 6 comprises said thread 4 and is adapted to be screwed into the female element 7 in order to form a threaded joint through the interaction of the threads 4 and 5. The first and second bodies 1, 3 thereby have a common axis of rotation and together form a device or at least a part of a device for chip forming machining according to the invention.

To one axial side of the thread-provided portion of the outer circumference, the male element of the first body 1 is provided with an outer circumference area 8 that is dimensioned for engaging by means of press fit, or contact, the corresponding inner circumference areas 9 of the female element 7 of the second body 3 when the thread 4 of the male element 6 engages and is located exactly opposite the thread 5 of the female element 7. It is also feasible for the male element 6 and the female element 7 to comprise circumference areas 14, 15 that equal said circumference areas 8, 9 but that are arranged to the other axial side of the threads 4, 5. For the sake of simplicity, only the circumference areas 8, 9 that are situated to the side of the threaded joint situated closest to the active cutting end of the tool 1 will be described. It shall however be appreciated that the corresponding circumference areas 14, 15 located to the opposite side of the threads 4, 5 may be formed according to any one of the principles that are relevant for the areas 8, 9. That means that all that is said about the design of said front circumference areas 8, 9 also may be applied to the optional rear circumference areas 14, 15. It should also be appreciated that the first and second bodies 1 and 3 may have only the areas 8, 9 located closest to said cutting inserts 2 or only said areas 14, 15, which are distanced from the cutting inserts or a combination of both of said areas. The areas 8, 9 in front of the threads 4, 5, and the areas 14, 15 behind the threads 4, 5, may be formed identically or differently within the scope of the invention. Two circumferentially continuous areas 16 and 17 are disposed between the first body 1 and the second body 3, to separate the threaded joint 4, 5 from the front press fit areas 8, 9, as well as to separate the threaded joint 4, 5 from the possible rear press fit areas 14, 15. It should also be mentioned that the second body 3 in the illustrated example of an embodiment comprises a stop face 18, in this case substantially ring-shaped, against which the first body 1 supports itself in order to take up the axial forces between said bodies 1, 3.

Each one of the areas 8 and 9 has a given length in the direction of the axis of rotation, i.e., transverse to the circumferential direction. In said pair of outer circumference and inner circumference areas 8, 9, the outer circumference of the male element 6 (see FIGS. 3 and 4) or the inner circumference of the female element 7 (see FIGS. 5 and 6) has an out-of-roundness, such that press fit is only present along two, preferably three or more areas 10–13 which have been determined before hand, which are separated from each other in the circumferential direction of the male and female elements. In the illustrated examples, four press fit areas 10–13 are formed in accordance with the principle according to the invention.

Figure 3:
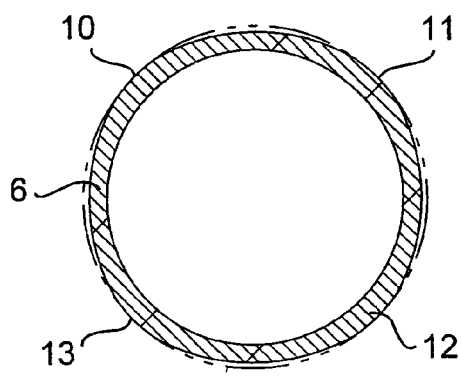
FIG. 3 is a cross-section of an example of an embodiment of the first rotatable body having an out-of-roundness shown on an exaggerated scale.
Figure 4:
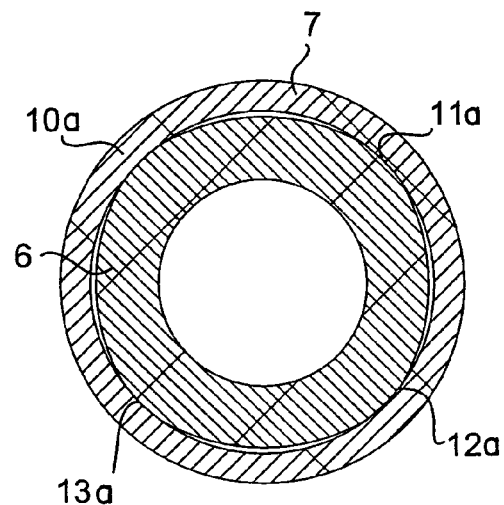
FIG. 4 is a cross-section showing the body according to FIG. 3 inserted into a second body in a press fit area.

FIGS. 3 and 4 show an example of an embodiment where the out-of-roundness is only present in the male element 6. The out-of-roundness is normally brought about by mechanical machining, e.g., turning, milling or grinding of the oversized areas that in the circumferential direction separate the areas along which the press fit is meant to be present, i.e., the areas along which the outer dimensions of the male element 6 will be oversized in relation to the inner dimensions of the female element. Naturally, a certain out-of-roundness will also arise in the corresponding female element 7, due to the fact that it will be somewhat deformed when it is pressed onto the male element. Furthermore, material will be pressed out from the areas where the male element is oversized and into adjacent parts of the mechanically machined areas where the outer dimensions of the male element 6 generally are mainly identical to, or somewhat smaller than the inner dimensions of the female element 7.

Figure 5:
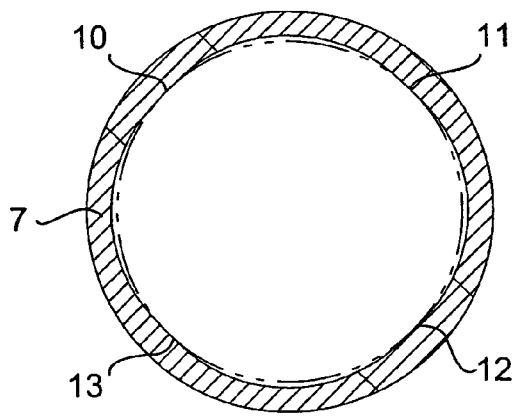
FIG. 5 is a cross-section showing an example of an embodiment of a second body according to the invention, the inner circumference of which having an out-of-roundness shown on an exaggerated scale.
Figure 6:
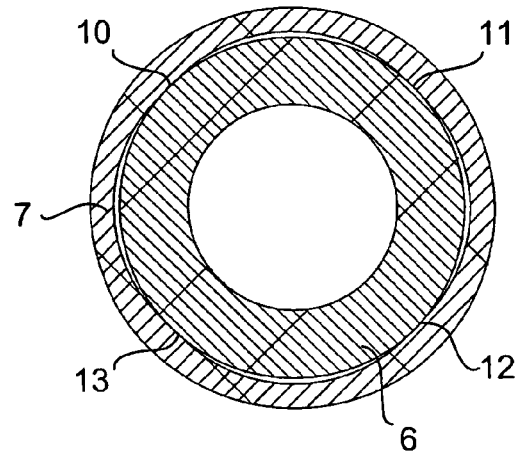
FIG. 6 is a cross-section showing the second body according to FIG. 5 when it surrounds a first body in a press-fit area.

FIGS. 5 and 6 shows a second example of an embodiment, in which first portions of the inner circumference of the female element have been given a larger inner radius than second portions 10a–13a by e.g., grinding such first portions, so as to render the portions 10a–13a undersized.

Oversized areas 10–13 of the outer dimensions of the male element (FIGS. 3 and 4) or undersized areas 10a–13a of the inner dimensions of the female element 7 (FIGS. 5 and 6) are symmetrically distributed in the circumferential direction such that the areas 10–13 (or 10a–13a) where press fit is present in all essentials are symmetrically distributed, as seen in said circumferential direction. In the case of a plurality of oversized areas of the male element, these are generally equally long in the circumferential direction. The same is also valid for the undersized areas in the case of undersized inner dimensions of the female element 7.

In the preferred example of an embodiment, the male element 6 and the female element 7 are formed from tubes that have been mechanically machined in predetermined separate areas along the circumference of said element in order to achieve said out-of-roundness. The out-of-roundness may be considered as being achieved by local reductions of the wall thickness of the tubes. The transition from areas of oversize to areas of undersize in relation to the dimension of the respective body with which they are to be brought into press fit with is preferably continuous, i.e., gentle or shaped as a chamfering, and not in the form of distinct steps.

It is to advantage if the male element 6 or the female element 7 in the circumferential direction comprises continuous tube walls in the circumference areas 8, 9 where the out-of-roundness or radius variation of the outer circumference of the male element 6, and the inner circumference of the female element 7, respectively, are present. However, it should not be excluded that the out-of-roundness may comprise one or more holes being arranged in said tube wall areas 8, 9, i.e., a local lack of wall in the areas that are to separate the areas 10–13 or 10a–13a where press fit is meant to be present.

It is also fully possible that both the outer circumference of the male element 6 and the inner circumference of the female element in said areas 8, 9 are out of round, but for technical reasons linked to production, it should be preferred that only one of said elements 6, 7 is provided with the out-of-roundness determined before hand.

Furthermore, it may be conceived that the areas 10–13, along which there will substantially be press fit, are not entirely separated from each other, seen in the circumferential direction, but it is preferable that they are entirely separated from each other along at least one line seen in the circumferential direction, preferably along a zone between two preferably parallel lines seen in the circumferential direction.

The invention also comprises the possibility to create a narrow strip with press fit contact between male elements and female elements that permits connection of the main areas 10–13 or 10a–13a where press fit is present, or to create a number of islands of oversize or undersize on the circumferential surface of the male element and the female element, respectively, in order to attain press fit in the area of such islands.

It should be realized that a plurality of variants of the invention will be obvious for one skilled in the art, without the same thereby deviating from the framework of the invention, and thereby the scope of protection that is defined in the accompanying claims, with support from the description and the accompanying drawings.

For example, the number and/or geometry of areas 10–13 or 10a–13a with press fit can be adapted to individual cases, without deviating from the framework of the invention.

It will be fully possible to form outer circumference and inner circumference areas 8, 9 with cooperating wedge-shapes in the longitudinal direction of the body, i.e., the cross-section of the male body would increase in one axial direction and engage a cross-section of the female body that decreases in the same axial direction. Also other shapes, such as cambered areas, are feasible.

Although the present invention has been described in connection with preferred embodiments thereof, it will be appreciated by those skilled in the art that additions, deletions, modifications, and substitutions not specifically described may be made without departing from the spirt and scope of the invention as defined in the appended claims.

What is claimed is:

1. Device for chip forming machining comprising a first rotatable body and a second rotatable body arranged along a common axis of rotation; the first body defining a male element having a male thread integrally formed on the male element such that the male element and the male thread form a one-piece unitary male element, and the second body defining a female element having a female thread integrally formed on the female element such that the female element and the female thread form a one-piece unitary female element, into which the male element is inserted for the forming of a joint; the respective threads forming a threaded joint between the first and second bodies; the male element comprising at least one outer circumference surface displaced in the axial direction in relation to the thread thereof, and which by a press fit engages a corresponding inner circumference surface of the female element; at least one of the outer circumference surface of the male element and the inner circumference surface of the female element has an out-of-roundness, wherein the press fit occurs along two or more predetermined areas of press fit separated from each other in a circumferential direction.

2. Device according to claim 1, wherein the press fit areas are generally symmetrically distributed in the circumferential direction.

3. Device according to claim 2 wherein the press fit areas are of substantially equal length, as viewed in said circumferential direction.

4. Device according to claim 1 wherein the press fit areas are of substantially equal length in said circumferential direction.

5. Device according to claim 1 wherein the out-of-roundness is formed by reductions in wall thickness of tubular portion of the element having the out-of-roundness.

6. Device according to claim 1 wherein one of the first and second bodies comprises a drilling tool provided with cutting inserts.

7. Device according to claim 6 wherein the circumference area having the out-of-roundness is located to an axial side of the threaded joint that is adjacent to the cutting inserts.

8. Device according to claim 1 wherein one of the first and second bodies comprises an elongate tube connecting the other of the first and second bodies to a machine for rotation of the first and second bodies.

9. Device for chip forming machining comprising a first rotatable body and a second rotatable body arranged along a common axis of rotation; the first body defining a male element, and the second body defining a female element, into which the male element is inserted for the forming of a joint; the male and female elements are provided with respective male and female threads forming a threaded joint between the first and second bodies; the male element comprising at least one outer circumference surface displaced in the axial direction in relation to the thread thereof, and which by a press fit engages a corresponding inner circumference surface of the female element; at least one of the outer circumference surface of the male element and the inner circumference surface of the female element has an out-of-roundness, wherein the press fit occurs along two or more predetermined areas of press fit separated from each other in a circumferential direction, wherein the out-of-roundness is present on both sides of the threaded joint.

10. A rotatable male body adapted to be screwed into a female body; the male body defining a longitudinal axis of rotation and having an external male thread and a press fit surface integrally formed on an outer circumference of the male body such that the male body and the male thread form a one-piece unitary male body; the press fit surface including predetermined first portions of the outer circumference having a larger radial distance from the axis than second portions disposed circumferentially between the first portions.

11. The rotatable male body according to claim 10 wherein the first portions are symmetrically distributed in the circumferential direction.

12. The rotatable male body according to claim 10 wherein the first portions are of substantially equal length measured in the circumferential direction.

13. The rotatable male body according to claim 10 wherein the body is tubular, and the first portions are defined by tube regions of greater thickness than the second portions.

14. The rotatable male body according to claim 10 wherein the body carries cutting inserts.

15. The rotatable male body according to claim 14 wherein the press fit surface is disposed axially between the cutting inserts and the screw thread.

16. A rotatable male body adapted to be screwed into a female body; the male body defining a longitudinal axis of rotation and having an external male thread and a press fit surface formed on an outer circumference thereof; the press fit surface including predetermined first portions of the outer circumference having a larger radial distance from the axis than second portions disposed circumferentially between the first portions, wherein the body carries cutting inserts, and wherein the press fit surface is disposed on opposite axial sides of the male thread.

* * * * *